United States Patent

Nanataki et al.

[11] Patent Number: 6,005,594
[45] Date of Patent: Dec. 21, 1999

[54] FIXING APPARATUS HAVING A FIXING ROLLER WITH A NON-ADHESIVE SURFACE LAYER

[75] Inventors: Hideo Nanataki, Machida; Koichi Tanigawa, Tokyo; Yasumasa Ohtsuka, Yokohama; Takayasu Yuminamochi, Yokohama; Akihiko Takeuchi, Yokohama; Hiroto Hasegawa, Kawasaki, all of Japan

[73] Assignee: Canon Kabushiki Kaisha, Tokyo, Japan

[21] Appl. No.: 08/376,526

[22] Filed: Jan. 23, 1995

Related U.S. Application Data

[63] Continuation of application No. 08/113,311, Aug. 30, 1993, abandoned, which is a continuation of application No. 07/674,944, Mar. 26, 1991, abandoned.

[30] Foreign Application Priority Data

| Mar. 26, 1990 | [JP] | Japan | 2-73293 |
| Oct. 9, 1990 | [JP] | Japan | 2-272593 |
| Mar. 1, 1991 | [JP] | Japan | 3-036172 |

[51] Int. Cl.[6] .............. B41J 2/385; G03G 9/08
[52] U.S. Cl. .......................... 347/156; 399/333
[58] Field of Search .............. 399/33, 320, 324, 399/328, 330, 331, 333; 219/216, 469, 338; 346/25; 347/102, 155, 156, 212; 355/405; 430/203

[56] References Cited

U.S. PATENT DOCUMENTS

| 4,264,181 | 4/1981 | Lentz et al. | 219/216 X |
| 4,320,714 | 3/1982 | Shimazaki et al. | 219/216 X |
| 4,533,231 | 8/1985 | Shigenobu | 219/216 X |
| 4,745,431 | 5/1988 | Kogure et al. | 219/216 X |
| 5,011,401 | 4/1991 | Sakurai et al. | 355/282 X |

FOREIGN PATENT DOCUMENTS

| 55374 | 4/1980 | Japan | 355/284 |
| 96970 | 7/1980 | Japan | 355/284 |
| 140280 | 7/1985 | Japan | 355/284 |
| 91672 | 3/1990 | Japan | 355/284 |
| 213886 | 8/1990 | Japan . | |

*Primary Examiner*—N. Le
*Assistant Examiner*—L. Anderson
*Attorney, Agent, or Firm*—Fitzpatrick, Cella, Harper & Scinto

[57] ABSTRACT

A fixing apparatus prevents the offset of toner onto a fixing roller, by forming a surface mold release layer made of pure fluororesin material on a core member of the fixing roller and by applying a bias voltage to the fixing roller.

30 Claims, 9 Drawing Sheets

FIXING APPARATUS HAVING A FIXING ROLLER WITH A NON-ADHESIVE SURFACE LAYER

This application is a continuation of application Ser. No. 08/113,311 filed Aug. 30, 1993, which in turn is a continuation of application Ser. No. 07/674,944 filed Mar. 26, 1991, both now abandoned.

BACKGROUND OF THE INVENTION

1. Field of the Invention

The present invention relates to a fixing apparatus used with an image forming system such as a laser beam printer, copying machine and the like.

2. Related Background Art

An example of a conventional fixing apparatus is shown schematically in FIG. 1.

A fixing roller 1 is formed by coating an insulative layer 3 made of fluororesin, silicone resin and the like on a rigid metallic roller, and a pressure roller 2 presses against the fixing roller 1. A recording medium which bears a toner image formed by electrophotography is passed between the fixing roller 1 and the pressure roller 2, so that the toner image is fixed onto the recording medium. Further, in the apparatus shown in FIG. 1, a DC voltage is applied between the fixing roller 1 and the pressure roller 2 so that the fixing roller contacting the toner image has the same polarity as the toner image.

In this way, an electrostatic repelling force is generated between the fixing roller and the toner image, thereby preventing the occurrence of a so-called "offset phenomenon", where the toner adheres to the fixing roller.

However, in the above-described conventional fixing apparatus, adequate insulation is not obtained, and the offset phenomenon is not completely prevented, depending upon the surface condition of the fixing roller and the material of the insulative layer.

SUMMARY OF THE INVENTION

The present invention aims to eliminate the above-described drawbacks. An object of the present invention is to provide a fixing apparatus wherein the offset phenomenon does not occur between the fixing roller and the toner.

Another object of the present invention is to provide a fixing apparatus wherein the transfer blank phenomenon can be prevented.

A further object of the present invention is to provide a fixing apparatus which can stabilize a potential on the recording medium.

A still further object of the present invention is to provide a fixing apparatus which can suppress the generation of noise due to leakage of the bias of a fixing roller.

Other objects of the present invention will be apparent from the following description referring to the accompanying drawings.

DETAILED DESCRIPTION OF THE PREFERRED EMBODIMENTS

Figure 3:
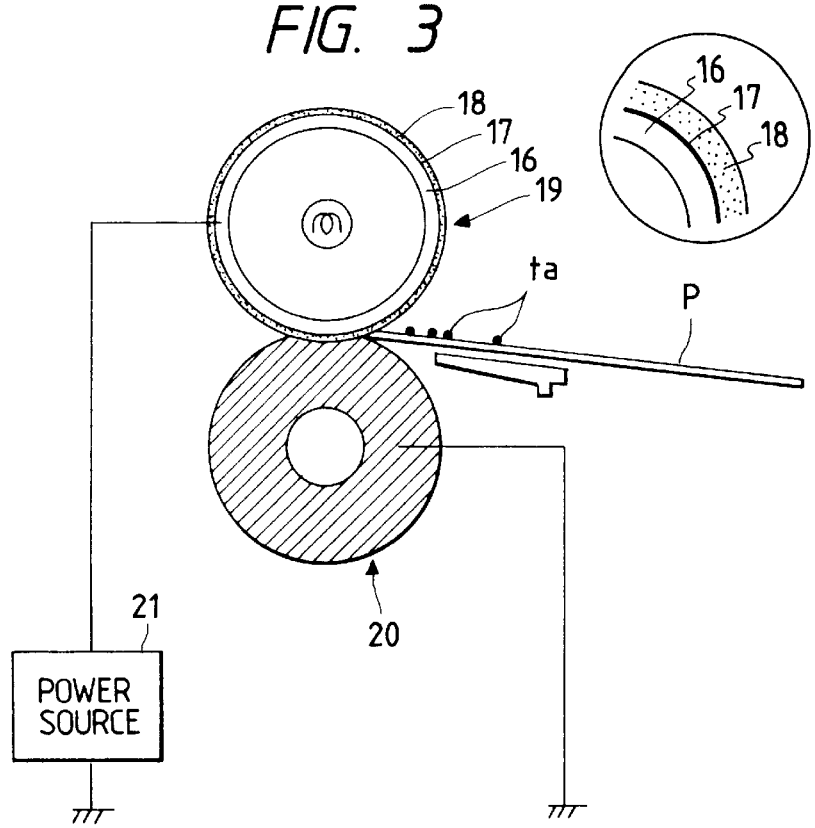
FIG. 3 is an elevational sectional view of a fixing apparatus according to a first embodiment of the present invention.

A fixing apparatus according to a first embodiment of the present invention is shown in FIG. 3.

Since the operating process of the fixing apparatus is the same as that of the above-described conventional fixing apparatus, the explanation thereof is omitted.

A pure fluororesin layer 18 (having a volume resistivity of $10^{14}$ Ω·cm or more) is coated on a conductive core member 16 via a primer layer 17. The fluororesin may be PFA, PTFE, FEP or the like. A pressure roller 20 acting as a back-up roller is urged against a fixing roller 19 constructed as mentioned above. A bias having the same polarity as that of toner is applied to the fixing roller 19 from an electric power source 21.

As mentioned above, by using pure fluororesin as the non-adhesive surface layer of the fixing roller, the surface of the fixing roller is sufficiently insulated, with the result that a sufficient repelling force is generated between the fixing roller 19 and the toner. Also, an attractive force is generated between the pressure roller and the toner. Thus, the toner is adequately fixed onto a recording medium and the offset phenomenon where the toner adheres to the fixing roller is prevented.

However, in the above-mentioned first embodiment, although the problem regarding the offset of the toner is eliminated, the following new problem occurs.

Figure 2:
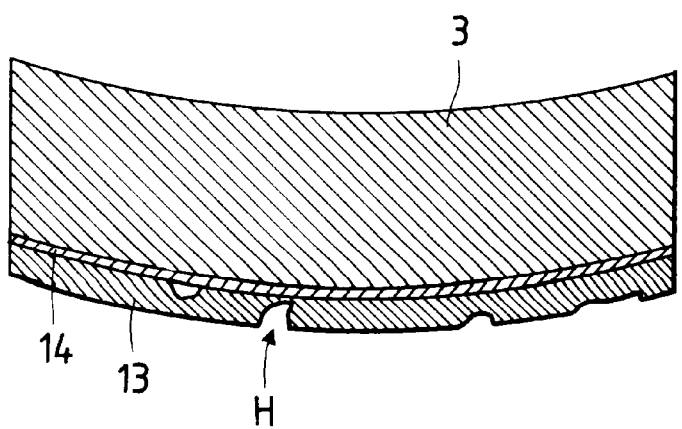
FIG. 2 is a partial sectional view of a fixing roller showing pinholes formed in a non-adhesive surface layer on the fixing roller.

For example, when a bias voltage of −1.5 kv is applied to the fixing roller 19 formed by coating PFA resin having a thickness of 25 $\mu$m on an aluminum core member 16 coated by the primer layer 17, a current of 5–400 $\mu$A will flow when the recording medium is passed through the fixing apparatus. Generally, although the pure PFA resin is an insulating material, if a single coating layer is used, as shown in FIG. 2, a great number of imperfect portions (pinholes) H are created in the tissue of the surface separating agent, with the result that the non-adhesive surface layer sometimes does not perform as an insulating layer. In that case, the current leaks through the recording medium, leading to the problem that the transfer mechanism of the image forming system is adversely affected.

Now, a second embodiment of the present invention will be explained.

Figure 4:
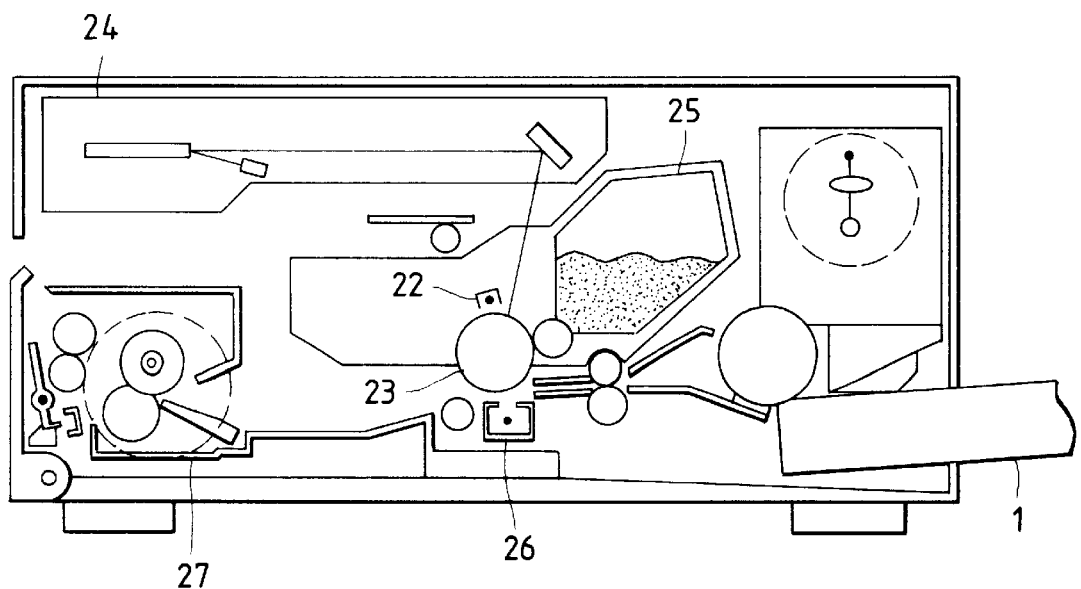
FIG. 4 is an elevational sectional view of an image forming system incorporating the fixing apparatus according to the present invention.

FIG. 4 is an elevational sectional view of an image forming system such as, for example, a laser beam printer to which the present invention may be applied. A photosensitive member 23 is uniformly charged by a charging means 22 and is exposed by an exposure means 24 on the basis of image information to form an electrostatic latent image. The latent image formed on the photosensitive member is changed to a toner image by a developing means 25, and the toner image is transferred onto the recording medium by means of a transfer means 26. The recording medium bearing the non-fixed toner image is fed to a fixing means 27, where the toner image is fixed onto the recording medium by heat and pressure. Thereafter, the recording medium is ejected out of the image forming system. In this arrangement, the maximum length of the recording medium is greater than the distance between the transfer means and the fixing means.

The fixing apparatus according to the second embodiment of the present invention used with the above-described image forming system will now be explained.

Figure 1:
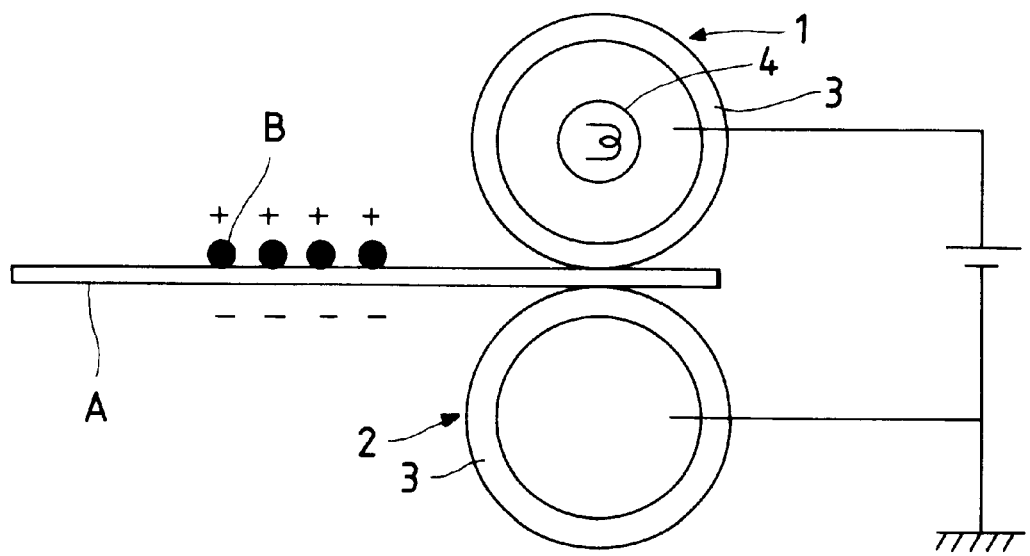
FIG. 1 is an elevational sectional view of a conventional fixing apparatus.
Figure 5:
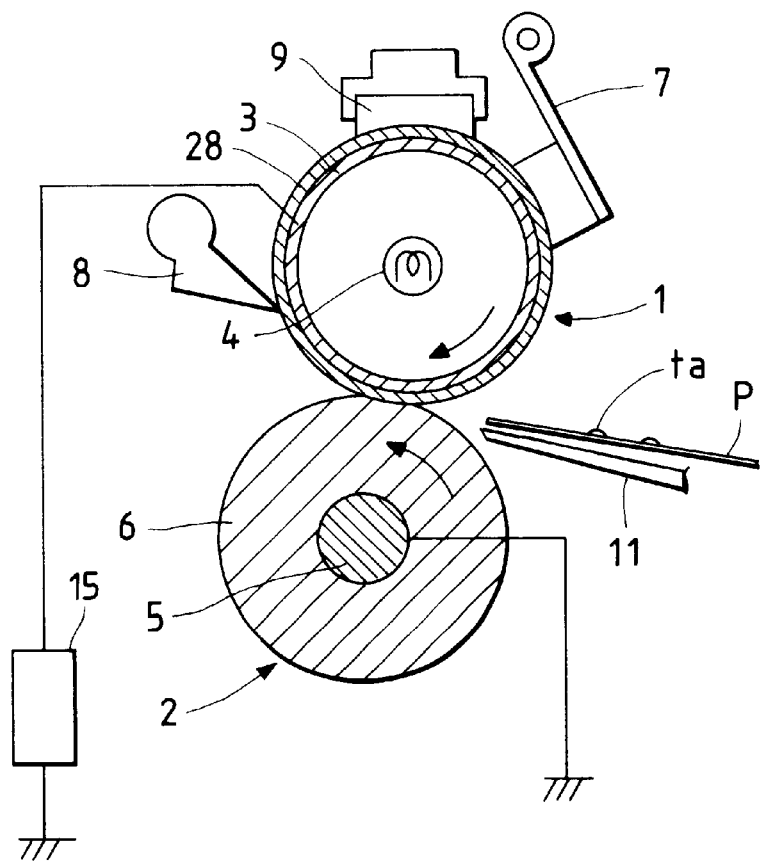
FIG. 5 is an elevational sectional view of a fixing apparatus according to a second embodiment of the present invention.
Figure 6:
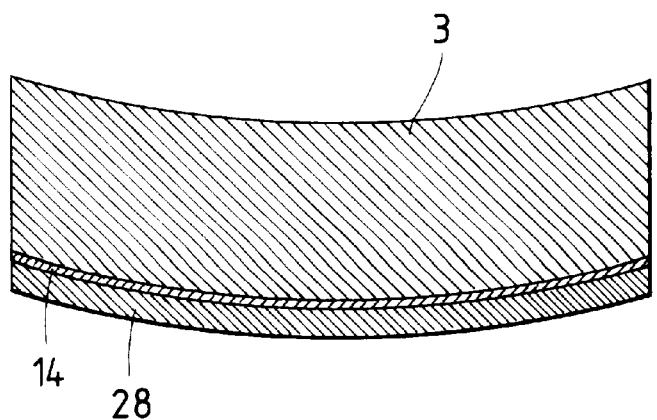
FIG. 6 is a partial sectional view of a fixing roller wherein a non-adhesive surface layer is formed as a tube-like configuration.

First, the fixing apparatus according to the second embodiment will be described with reference to FIGS. 5 to 7. The same elements as those shown in FIG. 1 are designated by the same reference numerals, and the explanation thereof is omitted.

In this second embodiment, the fixing roller 1 is a rotary member formed by coating a core member (conductive core member) 3 made of aluminum, stainless steel or the like with a PFA (pure fluororesin) tube 28. According to this embodiment, as shown in FIG. 6, the PFA tube 28 acting as the non-adhesive surface layer is coated as the outermost layer on the conductive core member and does not generate any pinholes. Thus, excellent insulation is provided. The PFA tube 28 in this embodiment has a volume resistivity of $10^{14}$ $\Omega$·cm or more (i.e., surface resistance of $10^{12}$ $\Omega$ or more).

Figure 7A:
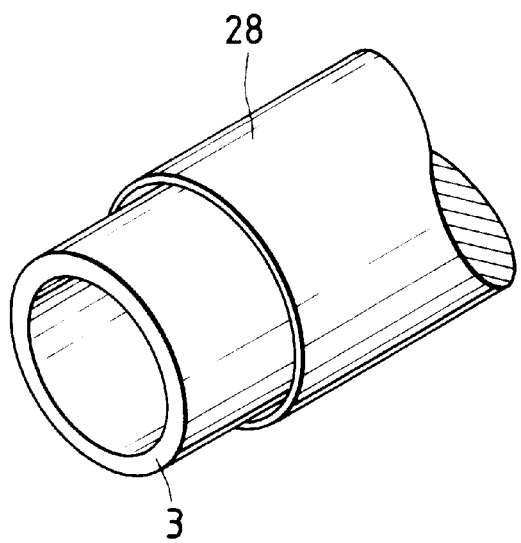
FIGS. 7A and 7B are perspective views showing molding processes for forming the tube-like fixing roller.
Figure 7B:
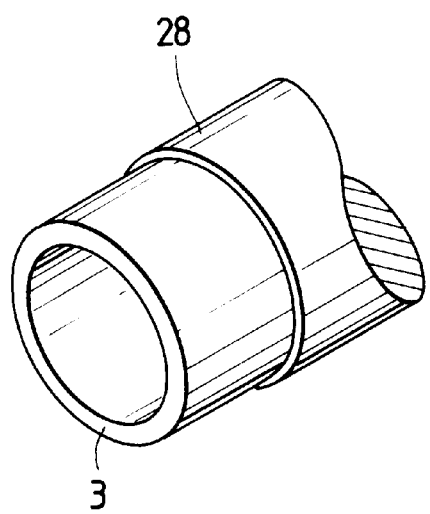

A molding process for the fixing roller 1 is shown schematically in FIGS. 7A and 7B. FIG. 7A illustrates a tube-like thin PFA film 28 previously manufactured in a discrete process. This film can easily be formed as a uniform film solely from the PFA resin. After the core member 3 coated by the primer layer is surrounded by the thin PFA film 28 so formed, as shown in FIG. 7B, the thin PFA film is contracted or shrinked by applying heat, so that the thin film adheres to the core member 3 through the primer layer.

A feature of the PFA layer so formed is that it does not include any pinholes H as shown in FIG. 2. Thus, in the illustrated embodiment using the fixing roller having the above-described PFA tube, even when a high voltage is applied to the core member, current does not leak through the recording medium P. Accordingly, if a power source (voltage applying means) 15 having a smaller current capacity is used, the applied voltage is not decreased, and thus the offset phenomenon is suppressed. Further, since the current does not leak to temperature-sensitive elements disposed around the fixing roller, an excellent advantage is obtained including the security and/or the protection of electrical elements. In addition, since the transfer mechanism is not adversely affected by the small leak current, a good image can be obtained.

Next, a test result will be described.

The following Table 1 shows the values of the leak current, transfer blank and electrostatic offset comparing a case where the recording medium is passed through a conventional fixing apparatus using a fixing roller having a PFA coating and a case where the recording medium is passed through a fixing apparatus using a fixing roller having a PFA tube as in the illustrated embodiment of the present invention. The values were obtained both when the power source having sufficient capacity to apply a constant voltage of −1.5 kv to the core member was used and when the fixing roller was grounded. The diameter of the fixing roller was 30 mm and the thickness of the PFA layer was 25 $\mu$m in both cases.

TABLE 1

| Measuring environment | PFA layer | Leak current $\mu$A | Transfer blank −1.5kv | Transfer blank earth | offset −1.5kv | offset earth |
|---|---|---|---|---|---|---|
| 15° C. | coating | 5 | ○ | ○ | Δ | X |
| 5% | tube | 0 | ○ | ○ | ○ | X |
| 25° C. | coating | 10 | Δ | ○ | Δ | X |
| 50% | tube | 0 | ○ | ○ | ○ | X |
| 30° C. | coating | 400 | X | Δ | ○ | ○ |
| 80% | tube | 3 | ○ | ○ | ○ | ○ |

○ = no occurrence
Δ = partial occurrence
X = occurrence

As apparent from the Table 1, when the voltage was not applied to the fixing roller, the transfer blank did not occur both in the cases of the PFA coating and the PFA tube. However, under the measuring environment of low temperature and low humidity, the electrostatic offset noticeably occurred in the cases both of the PFA coating and the PFA tube. The electrostatic offset can be suppressed by applying a voltage (for example, −1.5 kv) having the same polarity as that of the toner to the core member of the fixing roller. However, in the case where the PFA coating was used on the fixing roller, under the measuring environment of high temperature and high humidity, the current leaked to the transfer mechanism, thus generating a transfer blank due to the pinholes formed in the non-adhesive surface layer consisting of the PFA coating. However, when a PFA tube was used as the PFA layer as in the illustrated embodiment, it was found that both electrostatic offset and transfer blank did not occur in any of the measuring environments when the voltage was applied to the core member.

Figure 8:
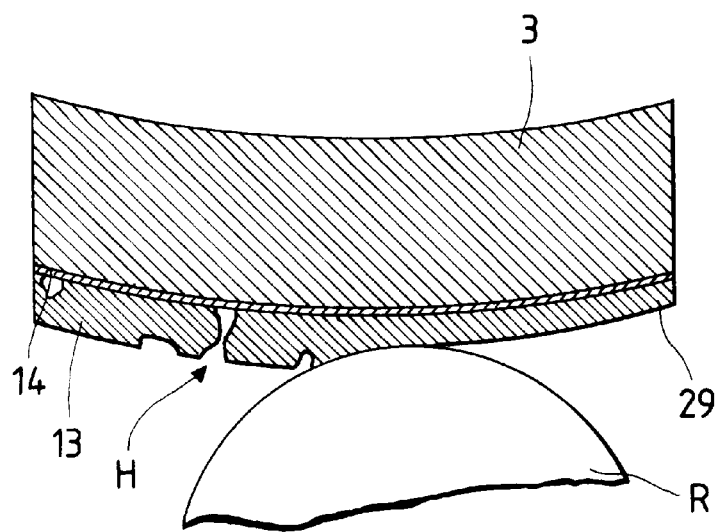
FIG. 8 is a partial sectional view of a fixing roller according to a third embodiment of the present invention.

Next, a third embodiment of the present invention will be explained with reference to FIG. 8. Incidentally, the same elements as the above-described conventional apparatus (shown in FIG. 1) and the corresponding elements of the present invention are designated by the same reference numerals, and the explanation thereof will be omitted.

In this third embodiment, the coating layer for the fixing roller consists of a modified PFA coating layer. As shown in FIG. 8, the process for manufacturing the fixing roller includes compressing a PFA layer 13 to form a high density tissue while pressurizing the layer by means of a rigid roller R and then fusing the compressed layer with heat. In this manner, it is possible to obtain a modified PFA layer 29 without any pinholes H. The fixing roller having a non-adhesive surface layer so formed can also attain the same technical advantages as the second embodiment, e.g., suppressing transfer blank and the offset phenomenon.

Further, the surface mold releasing agent layer according to this third embodiment also has the advantages that it can be more strongly adhered to the core member than the PFA tube and has excellent endurance.

Figure 9:
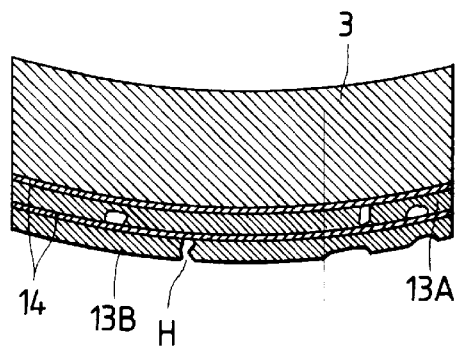
FIG. 9 is a partial sectional view of a fixing roller according to a fourth embodiment of the present invention.

Next, a fourth embodiment of the present invention will be explained with reference to FIG. 9.

In this fourth embodiment, a non-adhesive surface layer for the fixing roller comprises a plurality of PFA coating layers. According to this embodiment, an inner PFA coating layer 13A is coated by an outer PFA coating layer 13B so that any pinhole passing through one coating layer does not pass through the whole non-adhesive surface layer (constituted by the plural PFA coating layers). Therefore, technical advantages of the second embodiment can be obtained.

Since the surface mold releasing agent layer (PFA layers) according to this fourth embodiment can have a greater thickness than the thickness of the second embodiment, it is possible to greatly increase the resistance between the recording medium and the core member. Accordingly, this embodiment is particularly effective when the fixing roller is used under the high humidity environment where the resistance of the recording medium is noticeably reduced.

Figure 10:
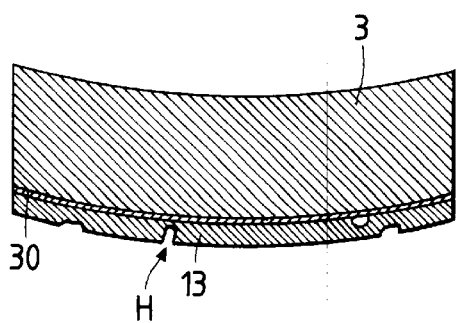
FIG. 10 is a partial sectional view of a fixing roller according to a fifth embodiment of the present invention.

Next, a fifth embodiment of the present invention will be explained with reference to FIG. 10.

In this fifth embodiment, a primer layer 30 having an insulation feature is adhered between the PFA coating layer 13 and the core member 3 of the fixing roller. According to this embodiment, it is possible to maintain the insulating capability of the fixing roller, regardless of the presence of pinholes H in the PFA coating layer 13. Thus, it is possible to make the PFA layer, which is expensive, thinner so that the cost of the fixing roller is reduced.

As mentioned above, by using pure fluororesin as the non-adhesive surface layer of the fixing roller to provide insulation, no current leaks from the core member to the recording medium even when the voltage is applied to the core member of the fixing roller in order to prevent the electrostatic offset. Thus, it is possible not only to maintain a stable offset suppressing voltage but also to prevent interference with the transfer mechanism, thus eliminating poor transfer and the like.

Although the present invention can prevent transfer blank and the offset phenomenon as mentioned above, the present invention also provides a fixing apparatus which can solve the following other problem.

The charges on a surface of the non-adhesive surface layer of the fixing roller increase as the insulation feature of the non-adhesive surface layer in increased. Consequently, the charges gradually accumulate on the surface of the layer, with the result that the electric field outside of the fixing roller may be greatly influenced by the accumulated charges. The electric field generated by the charging tends to weaken the electric field generated by the voltage applied to the core member for preventing the offset phenomenon. It was found that the effect of the charging sometimes cancelled the effect of the voltage applied to the core member of the fixing roller. Thus, the offset phenomenon was frequently generated. Accordingly, the above-described countermeasures may not be sufficient.

Figure 11:
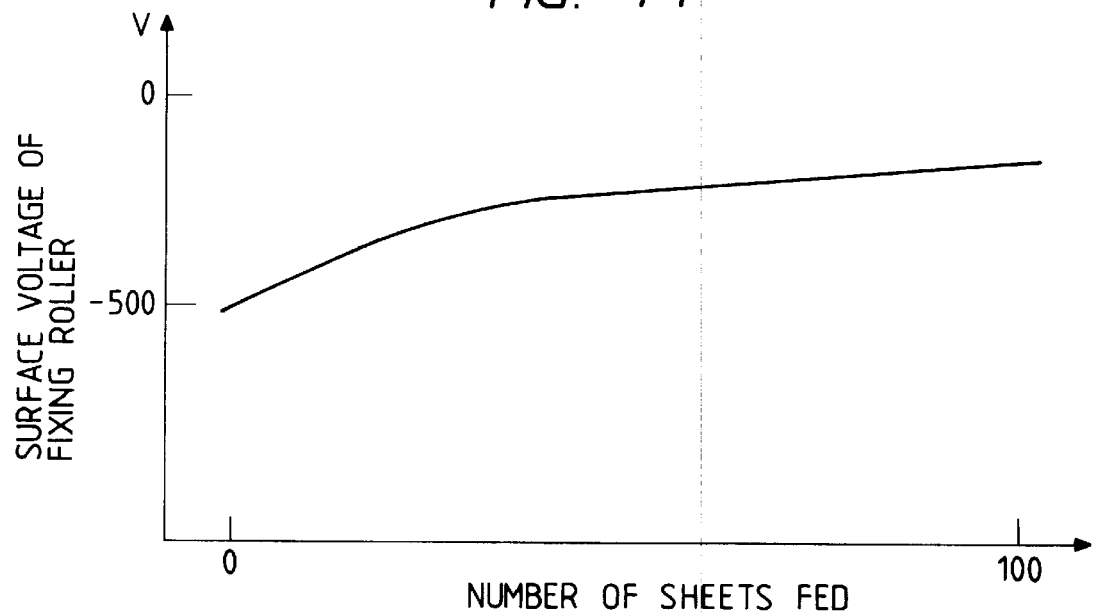
FIG. 11 is a graph showing the relation between a potential on a surface of the fixing roller and the number of sheets passed through the fixing roller.

The state of such charging can be ascertained by measuring the surface potential of the fixing roller. When a voltage of −500V is applied to a fixing roller coated by a PFA tube, the non-adhesive surface layer prevents the offset caused by the negatively-charged toner. When a number of sheets (recording media) are passed through the fixing roller, the change in the surface potential of the fixing roller will be as shown in FIG. 11. Further, FIG. 12 shows the change in the surface potential of the fixing roller during the time period when one sheet is being passed through the fixing roller, where $t_0$ indicates a time when a reading end of the recording medium (sheet) has just entered into a nip between the fixing roller and the pressure roller, and $t_1$ indicates a time when the recording medium has just left the nip.

As shown in FIG. 11, before the recording medium passes through the fixing roller, the voltage of −500V applied to the core member of the fixing roller is maintained as the surface potential. After 100 sheets have been passed through the fixing roller, the voltage is decreased to −250V. Thus, when the sheets are passed through the fixing roller repeatedly, positive charges accumulate on the surface of the fixing roller, with the result that the electric field generated by the charges cancel the electric field generated by the potential of the core member. In such a case, the effect of the potential of the core member acting as the offset suppressing means will be reduced, and it was ascertained that, after 100 sheets had been passed through the fixing roller, the offset phenomenon occurred noticeably.

Figure 12:
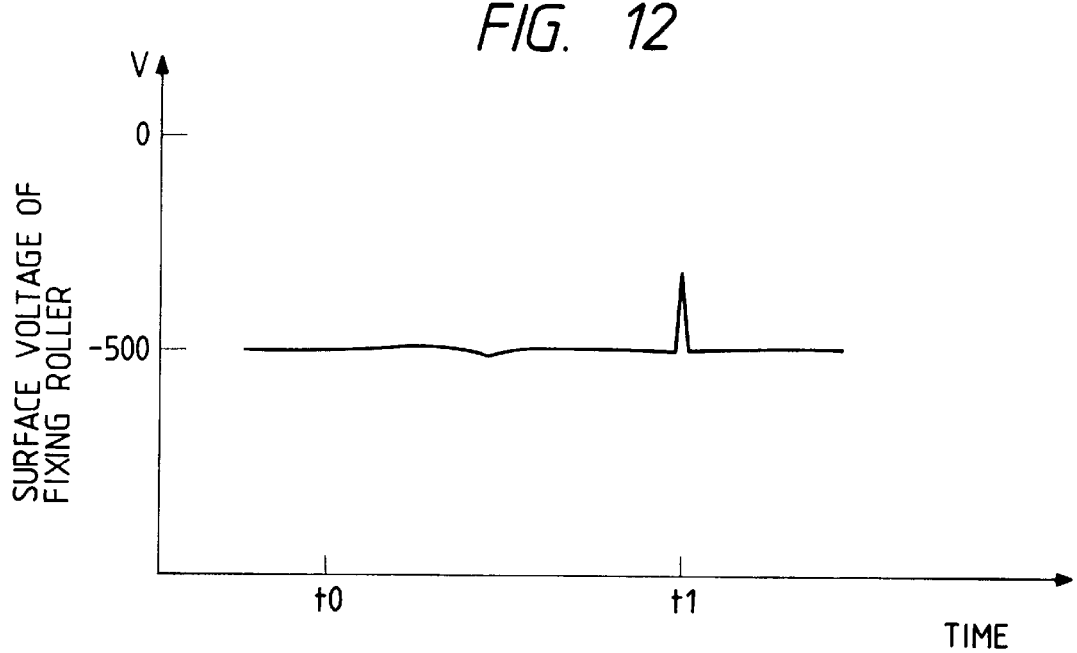
FIG. 12 is a graph showing the relation between the potential on the surface of the fixing roller and the time.

On the other hand, referring to FIG. 12, it is found that the charging is not generated by the friction between the sheet and the fixing roller but is mainly generated by the peeling of the sheet from the fixing roller. Within the time duration from the time to $t_0$ the time $t_1$, the surface potential of the fixing roller is almost unchanged in spite of the friction being generated between the recording medium and the fixing roller. However, a large surface potential is generated at the time $t_1$ when the recording medium is peeled from the fixing roller. This increase in the surface potential generated at the peeling of the recording medium (peel charging) is caused because there is a large potential difference between the potential of the core member of the fixing roller and the surface potential of the recording medium. However, because the purpose for applying the bias voltage to the core member is to urge the toner against the recording medium by the electric field created by such potential difference, the aforementioned peel charging cannot theoretically be eliminated.

Thus, a more effective fixing apparatus is provided by the following embodiment of the present invention.

Figure 13:
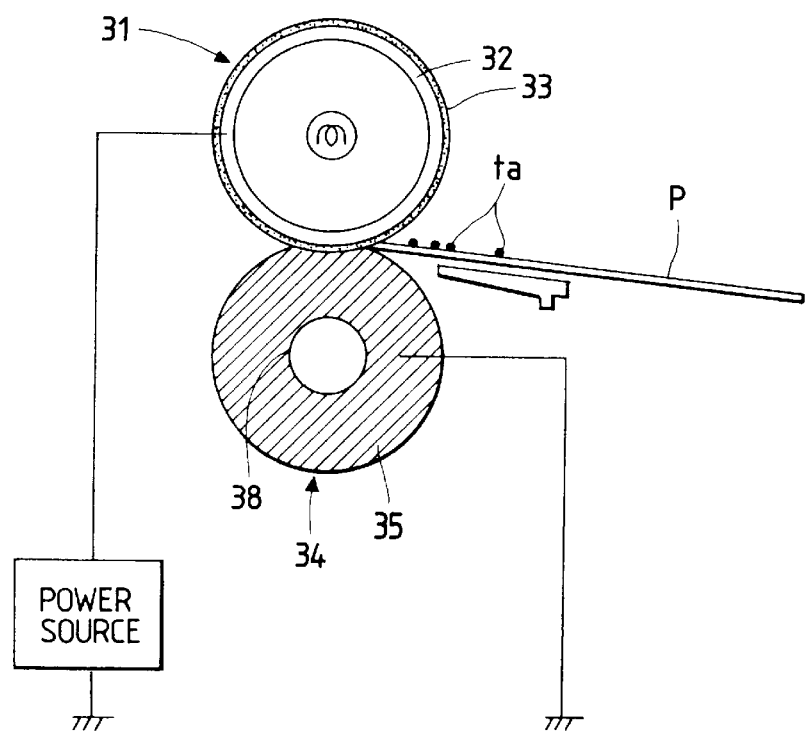
FIG. 13 is a sectional view of a fixing roller according to a sixth embodiment of the present invention.

FIG. 13 is an elevational sectional view of a fixing apparatus according to a sixth embodiment of the present invention. In the sixth embodiment, a fixing roller 31 is formed by coating a core member 32 made of aluminum, stainless steel or the like with the pure PFA resin tube 33 as shown in the second embodiment. The coating layer may be formed by performing a multi-coating treatment using fluororesin material or by using a material having a very high insulation property and endurance as an adhesive for the fluororesin. The coating layer acting as the insulative layer preferably has a volume resistivity of $10^{14}$ Ω·cm or more, a surface resistance of $10^{12}$ Ω or more, and an insulative pressure endurance of 1 kV or more.

The fixing roller 31 used in this embodiment has PFA tube with a thickness of 50 μm acting as the non-adhesive surface layer. It was found that it had an actual resistance of $10^{14}$ Ω or more (measured upon the application of 500 V by using the high resistance measuring device Model 4329A manufactured by Yokokawa Hyulet Packard Co.) and an insulative pressure endurance of 2 kV. The reason for obtaining such a high insulative property and high pressure endurance is that, when the PFA resin is formed in the tube-like shape, pinholes H as shown in FIG. 2 are eliminated from the tissue of the PFA resin tube. Thus, the high insulative property inherent to the PFA resin itself is maintained.

Further, conductive silicone rubber 35 is used as the elastic material constituting a surface layer of the pressure roller 34 acting as the back-up roller, and this elastic material is grounded. The pressure roller 34 formed by such conductive elastic material is not charged even if it slidingly contacts with the recording medium, and accordingly, does not affect the electrostatic repelling force upon the toner. Thus, the offset suppressing effect is improved. It is preferable that the electrical resistance of the conductive elastic material 35 is $10^5$ Ω·cm or less (volume resistivity) and becomes $10^{11}$ Ω or less (actual resistance) between the surface (10 cm$^2$) of the pressure roller and the core member of the pressure roller (upon application of 500 V). Further, in the arrangement wherein a portion of the recording medium enters into the fixing apparatus while being transfer-charged by the transfer means, (i.e., when the length of the recording medium is longer than the distance between the transfer means and the fixing means) if the pressure roller has an extremely low resistance, the current leaks through the recording medium unlimitedly under the high humidity environment. Thus, the possibility of poor transfer and the like arises. Accordingly, it is preferable that the conductive elastic material have a volume resistivity of $10^2$–$10^5$ Ω·cm to provide an actual resistance (of the pressure roller) of $10^3$–$10^{11}$ Ω. Thus, it is desirable that the volume resistivity value, at least near the surface of the back-up roller, is less than that of the non-adhesive surface layer (the pressure roller having such construction is referred to as a "conductive pressure roller" hereinafter).

When a voltage having the same polarity as that of the toner is applied to the core member 32 of the fixing roller to suppress the offset phenomenon, it is possible to stabilize the potential of the recording medium and to suppress the surface potential of the fixing roller to a minimum, by combining the conductive pressure roller with the fixing roller. A result is that the offset phenomenon can be effectively prevented even when a number of sheets are passed through the fixing roller continuously.

Next, a test result will be described.

When a PFA resin layer having a thickness of 300 μm was used as the non-adhesive surface layer of the fixing roller and the voltage of −500V was applied to the core member of the fixing roller as the offset suppressing bias, the surface potentials of the fixing roller generated when a number of sheets were passed through the fixing roller were measured and compared between a case where the conductive material was used as the elastic layer of the pressure roller and was grounded and a case where the insulative material was used as the elastic layer of the pressure roller. The conductive elastic material used here was selected to have a relatively high resistance value such as a volume resitivity of the order of $10^5$ Ω·cm to prevent the occurrence of a transfer blank because the fixing apparatus was not sufficiently spaced apart from the transfer mechanism in the arrangement used in this test. Incidentally, in this case, the actual resistance of the elastic material was about $10^9$ Ω.

Figure 14:
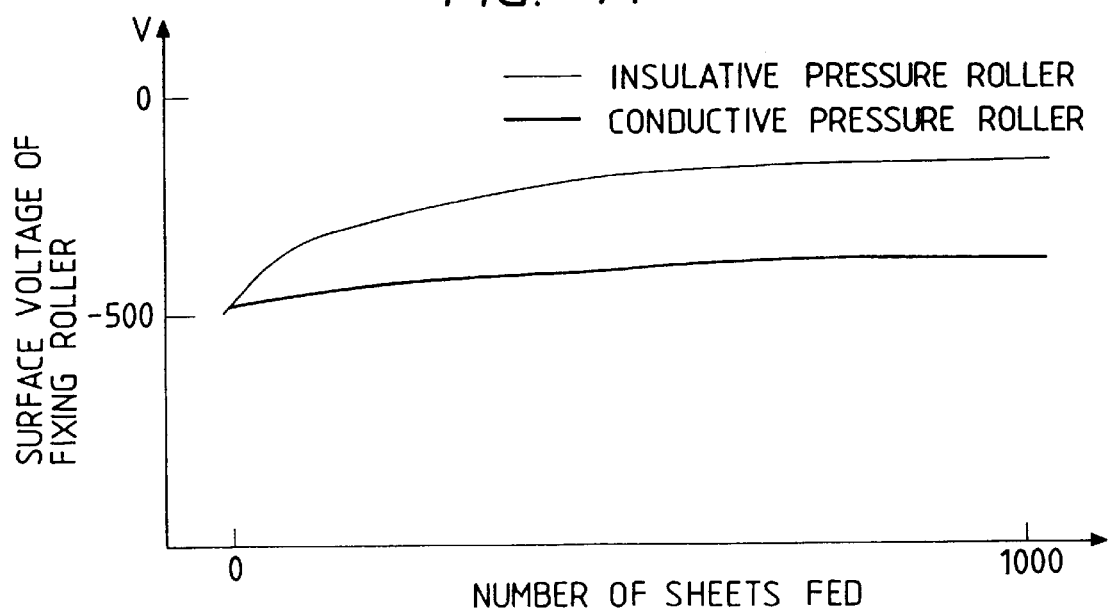
FIG. 14 is a graph showing the relation between a potential on a surface of the fixing roller and the number of sheets passed through the fixing roller, regarding two different pressure rollers.

As apparent from the test results shown in FIG. 14, when the insulating pressure roller was used, the fixing roller was charged to decrease the surface potential thereof by approximately 400 V after 1000 sheets had been passed through the fixing roller. However, when the conductive pressure roller was used, the surface potential of the fixing roller was merely decreased by approximately 100 V after 1000 sheets had been passed through the fixing roller.

Figure 15:
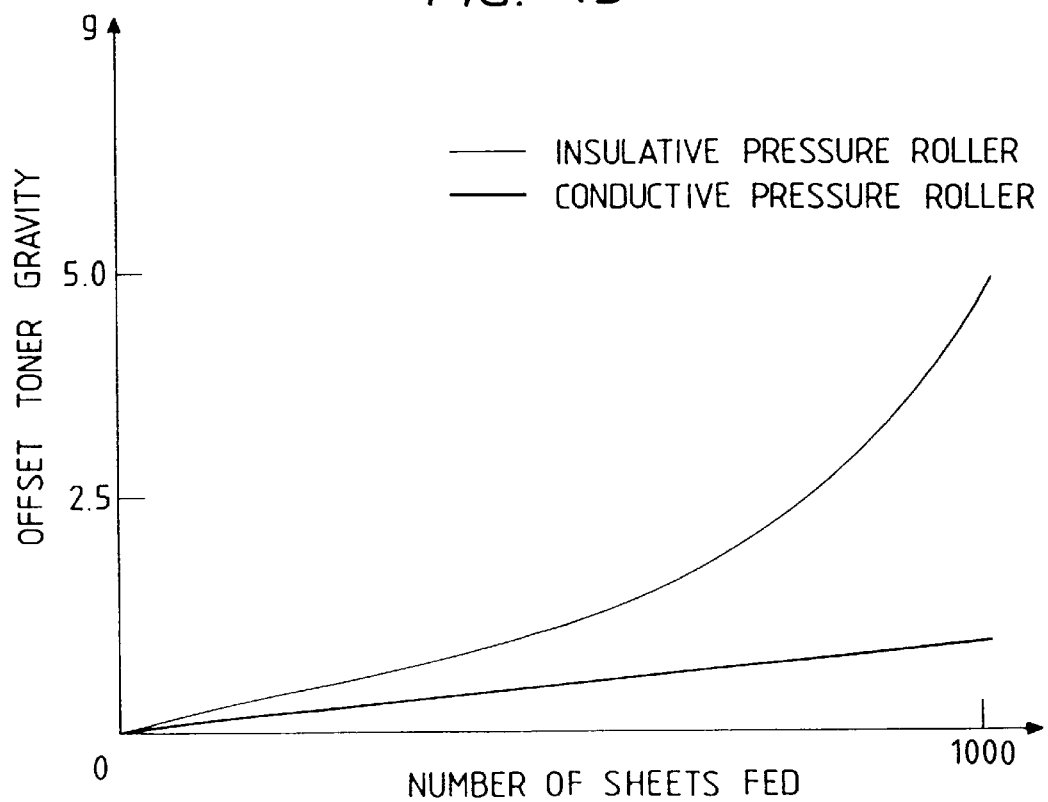
FIG. 15 is a graph showing the relation between the offset toner gravity and the number of sheets passed through the fixing roller.

FIG. 15 shows the relationship between the offset toner gravity and the number of the passed sheets measured in the above-mentioned cases. Incidentally, in this case, the toner was negatively charged. When the insulative pressure roller was used, the amount of the offset toner increased exponentially as the number of the passed sheets increased. However, when a conductive pressure roller was used, it was found that the amount of the toner offset was suppressed to a minimum amount.

Next, a seventh embodiment of the present invention will be explained.

Figure 16:
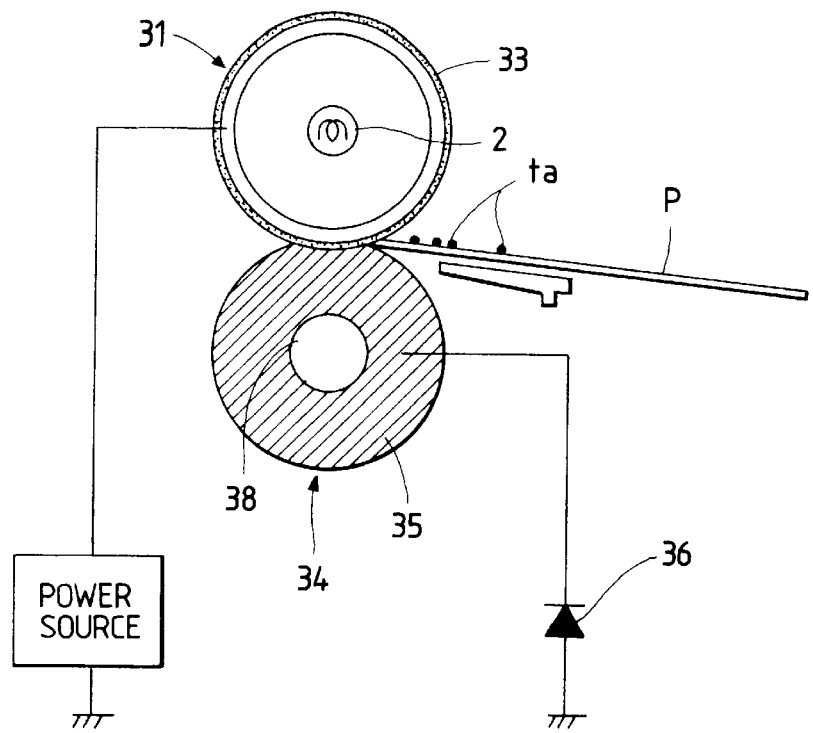
FIG. 16 is a sectional view of a fixing roller according to a seventh embodiment of the present invention.

FIG. 16 is an elevational sectional view of a fixing apparatus according to the seventh embodiment of the present invention. In this seventh embodiment, the conductive elastic material 35 of the pressure roller 34 is grounded via a rectifier element 36. The rectifier element 36 is connected in a direction so that the charges having a polarity opposite to that of the toner can be shifted from the earth side to the elastic material. As a result, the pressure roller is biased to have a polarity opposite to that of the toner, thus providing a self-biasing effect for suppressing the offset. Incidentally, the voltage applying means connected to the pressure roller is not limited to a rectifier element, but may comprise a power source, varistor, diode or the like. A maximum value of the potential given to the core member of the pressure roller by the self-biasing effect is equal to the inverse pressure endurance value of the rectifier element 36. Thus, if a rectifier element having excessively high inverse pressure endurance is selected, the charging of the fixing roller is enhanced, when charged up, but the charges are discharged to the core member of the fixing roller and other surrounding members, thus damaging such members or causing jamming. Therefore, it is preferable to select the rectifier element so that the maximum potential difference between the core member of the pressure roller and the core member of the fixing roller becomes 3 kV or less.

In view of the recent tendency for compactness, the system may be arranged so that the feeding path of the recording medium from the transfer mechanism to the fixing apparatus is short. In such an arrangement, if the resistance value of the conductive elastic material in the sixth embodiment is extremely low, the transfer current flows out through the conductive pressure roller and causes inconvenience such as transfer blank and the like. However, in such a case, the sixth embodiment of the present invention provides an advantage that the leakage of the transfer current is prevented by the rectifier element 36. Accordingly, with the arrangement as mentioned in the sixth embodiment, the conductive elastic material having a lower resistance value can also be used.

Next, an eighth embodiment of the present invention will be explained.

Figure 17:
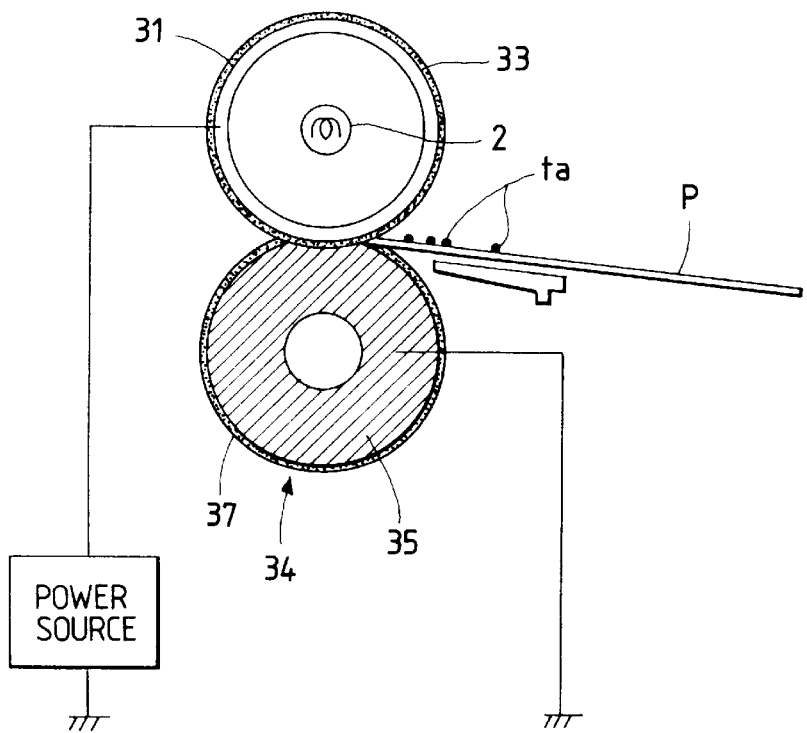
FIG. 17 is a sectional view of a fixing roller according to an eighth embodiment of the present invention.

FIG. 17 is an elevational sectional view of a fixing apparatus according to the eighth embodiment of the present invention. In this eighth embodiment, the non-adhesive surface releasing ability of the pressure roller 34 is further improved by providing a conductive PFA tube 37 acting as a surface separating agent layer on the conductive elastic material 35 of the pressure roller. The conductive PFA tube 37 generally has a volume resistivity of the order of $10^7$–$10^{10}$ $\Omega \cdot cm$ greater than that of the conductive silicone rubber. The thickness of the conductive PFA tube is a 100 $\mu m$ or less (preferably, 60 $\mu m$ or less), and, by combining this tube with the conductive elastic material, it is possible to prevent the charging of the pressure roller sufficiently. By providing the non-adhesive surface layer on the pressure roller, it is possible to prevent adhesion of the toner onto the surface of the pressure roller considerably compared to a pressure roller having a single silicone rubber layer. Thus, the adhesion of the recording medium onto the pressure roller and/or the smearing of the back surface of the recording medium are avoided.

In this eighth embodiment, while the conductive PFA tube was used as the non-adhesive surface layer, an ordinary fluororesin tube or coating may be used as the non-adhesive surface layer to achieve the same technical effect, so long as the actual resistance value thereof is reduced by making the layer thinner. Further, by using a conductive primer material as a primer layer for such fluororesin surface mold releasing agent layer, it is possible to further reduce the resistance value.

When the flow-out of the toner holding charges from the recording medium due to the conductivity of the pressure roller becomes an issue, a rectifier element 36 as shown in the seventh embodiment may be incorporated.

However, with the arrangements as shown in the sixth to eighth embodiments, if the insulation between the fixing roller and the pressure roller is insufficient, it is possible that the voltage cannot be applied to the fixing roller due to a leak of the bias. Also, there may arise a discharge between the fixing roller and the pressure roller, generating noise, and adversely affecting the control of the system itself and/or the operation of the surrounding equipment.

A further embodiment of the present invention which can solve such problems will be described below.

Figure 18:
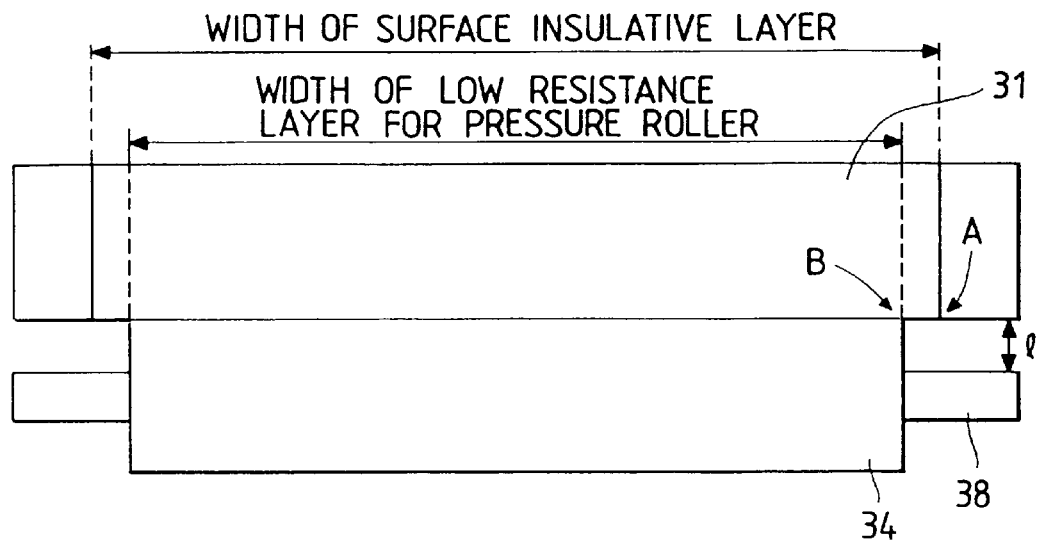
FIG. 18 is an elevational side view of a fixing roller and a pressure roller, according to a ninth embodiment of the present invention.

FIG. 18 shows a ninth embodiment of the present invention. Since the construction of this embodiment is similar to that of the sixth embodiment, the explanation of the same elements as those of the sixth embodiment will be omitted.

As apparent from FIG. 18 showing the axial positional relation between the fixing roller and the pressure roller, both ends A of the fixing roller 31 are positioned outwardly of both ends B of the low resistance layer of the pressure roller 34. A distance between the ends AB is selected, and a voltage V is applied to the core member of the fixing roller 31, to satisfy the following relation:

$$AB \geq V/300 + \alpha.$$

Thus, in the axial direction of the fixing roller, both ends of the surface separating agent layer of the fixing roller extend radially outwardly from both ends of the back-up roller.

The value AB was derived from the fact that, if the insulative pressure endurance of the normal gap is 1 KV/mm, the voltage causing the dielectric breakdown is lower and has a lower limit of about 300 V/mm. The value of a is a tolerance value generated in the assembling of the apparatus (also in consideration of the sliding discrepancy between the fixing roller and the pressure roller), and is normally 1 mm or less.

Next, a test result will be described.

When a PFA resin tube having a thickness of 50 $\mu m$ was coated on the fixing roller as the surface coating material for the fixing roller and a voltage of −600 V was applied to the core member of the fixing roller as the offset suppressing bias, the surface potentials of the fixing roller generated when a number of sheets were passed through the fixing roller were measured and compared between a case where the conductive material was used as the elastic layer of the pressure roller and was grounded and a case where the insulative material was used as the elastic layer of the pressure roller. Since the fixing apparatus was not sufficiently spaced apart from the transfer mechanism in the arrangement used in this test, the conductive elastic material used here was selected to have a relatively high resistivity value such as a volume resistivity of the order of $10^5$ $\Omega \cdot cm$ to prevent the occurrence of a transfer blank. Incidentally, in this case, the actual resistance of the elastic material was about $10^9$ $\Omega$.

With this arrangement, the distance between the end of the low resistance layer of the pressure roller 34 and the end of the insulative layer of the fixing roller 31 was 3 mm. It was found that, since the tolerance of the sliding discrepancy of the fixing roller and the like is 1 mm at most and V/300 equals to 2 mm, the bias voltage applied to the core member of the fixing roller 31 was not discharged to the low resistance layer of the pressure roller 34 so long as the above distance was selected to have a value of 3 mm.

On the other hand, when the distance between the end of the low resistance layer of the pressure roller 34 and the end of the insulative layer of the fixing roller 31 was 1.5 mm, it was found that voltage leaked between the fixing roller and the pressure roller generating noise in the surrounding equipment, and thus causing erroneous operation of the equipment.

Figure 19:
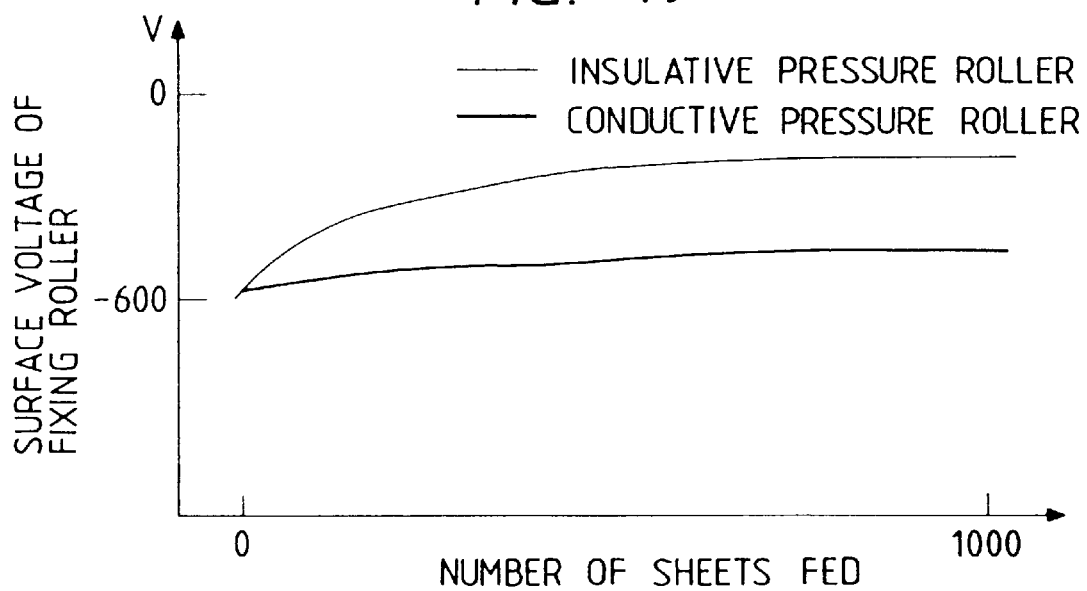
FIG. 19 is a graph showing the relation between the potential on the surface of the fixing roller and the number of sheets passed through the fixing roller, in the ninth embodiment.

FIG. 19 shows a test result indicating the change in the surface potential of the fixing roller measured in this arrangement. As apparent from FIG. 19, when an insulative pressure roller was used, the fixing roller was charged to decrease the surface potential thereof by approximately 400 V after 1000 sheets had been passed through the fixing roller. However, when a conductive pressure roller was used, the surface potential of the fixing roller was merely decreased by about 100 V after 1000 sheets had been passed through the fixing roller.

In this way, according to this embodiment, the occurrence of the offset phenomenon due to leakage of the bias and noise could be effectively prevented.

Next, a tenth embodiment of the present invention will be explained.

Since an elevational sectional view of a fixing apparatus according to this tenth embodiment is the same as that of the seventh embodiment, the illustration thereof is omitted. In this tenth embodiment, a distance between the end B of the low resistance layer of the pressure roller and the end A of the insulative layer of the fixing roller is indicated, referring to the voltage V' applied to the pressure roller and the bias voltage V, as follows:

$$AB = (V + V')/300 + \alpha.$$

Next, an eleventh embodiment of the present invention will be explained.

Since an elevational sectional view of a fixing apparatus according to this eleventh embodiment is the same as that of the eighth embodiment, the illustration thereof is omitted. In this eleventh embodiment, a distance between the end B of the low resistance layer of the pressure roller and the end A of the insulative layer of the fixing roller is indicated as AB=V/300+α.

Lastly, a twelfth embodiment of the present invention will be explained.

Figure 20:
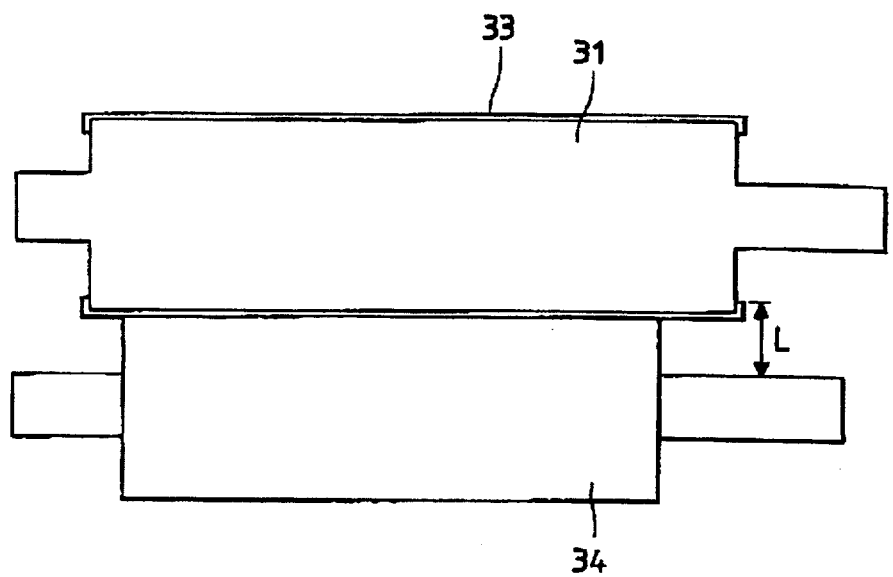
FIGS. 20 and 21 are elevational sectional side views of a fixing roller and a pressure roller, according to a tenth embodiment of the present invention.

In the above-mentioned embodiments, while the fixing roller was shown as a cylindrical shape, it may have stepped end portions formed by a drawing process or press fitting process, as shown in FIG. 20. The insulative layer 33 may be extended up to the end surfaces of the stepped end portions.

In this way, the length of the insulative layer along the contacting surface can be extended and a gap having a distance L from the core member of the pressure roller can be longer than the gap distance l shown in FIG. 18, thereby preventing leakage and discharge of the voltage through the gap.

Figure 21:
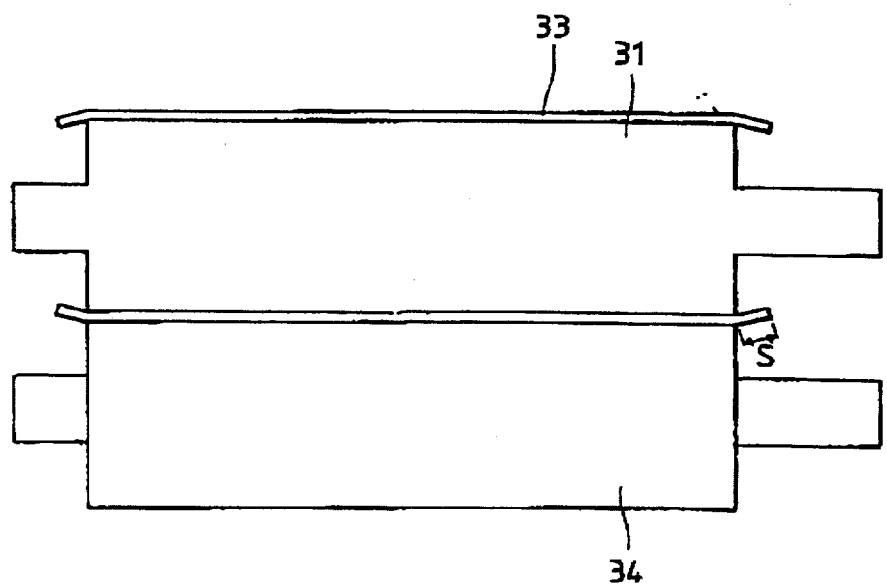

Further, as shown in FIG. 21, the insulative layer may be constituted by the PFA tube and such layer may protrude inwardly and outwardly from the stepped end portions without being adhered to the stepped end portions. In this case, a distance between the end of the low resistance layer of the pressure roller 34 and the core member of the fixing roller 31 can be substantially 2S, and the insulative distance from the core member of the pressure roller can be lengthened, thus preventing leakage of the voltage more effectively.

In all of the aforementioned embodiments, while the bias voltage was applied to the core member of the fixing roller, a voltage having a polarity opposite to the polarity of the toner may be applied to the pressure roller and the core member of the fixing roller may be grounded.

As mentioned above, according to the present invention, the potential of the recording medium can be stabilized, the charging of the surface of the fixing roller can be reduced, and a sufficient offset suppressing effect can be maintained. Further, it is possible to prevent the occurrence of the offset phenomenon and the occurrence of noise due to leakage of the bias of the fixing roller.

It should be noted that the present invention is not limited to the illustrated embodiments, but various alterations and modifications can be adopted within the scope of the present invention.

What is claimed is:

1. A fixing device, comprising:
   a fixing rotary member having an electrically conductive core member and an electrically insulative non-adhesive surface layer provided thereon;
   voltage applying means for applying a bias voltage having the same polarity as an unfixed toner image to said conductive core member; and
   a back-up member forming a nip with said fixing rotary member,
   wherein a recording material bearing an unfixed toner image is passed through the nip to fix the unfixed toner image on the recording material, and
   wherein said back-up member includes a low resistance elastic layer at a surface thereof or in the vicinity of the surface,
   wherein both ends of said non-adhesive surface layer extend outwardly over both ends of said low resistance elastic layer, and
   wherein, when the voltage applied to said rotary member is V(V), a difference $\overline{AB}$ (mm) in distance between the end of said non-adhesive surface layer and the corresponding end of said back-up member is indicated as the following equation:

$\overline{AB}$=V/300+α(mm)

wherein α is a tolerance value and α≦1 mm.

2. A fixing device according to claim 1, wherein a volume resistivity value of said non-adhesive surface layer is not less than $10^{14}$ Ω cm.

3. A fixing device according to claim 1, wherein said non-adhesive surface layer is made of pure fluororesin.

4. A fixing device according to claim 1, wherein a volume resistivity value of said low resistant elastic layer is $10^2$ to $10^5$ Ω cm.

5. A fixing device according to claim 1, wherein said elastic layer is a surface rubber layer.

6. A fixing device according to claim 1, wherein said elastic layer of low electrical resistance is a rubber layer, and an electrically insulative surface resin layer is provided on said rubber layer.

7. A fixing device according to claim 1, wherein said distance $\overline{AB}$ is V/300 (mm).

8. A fixing device according to claim 1, further comprising electrical charge removing means for removing an electrical charge on said non-adhesive surface layer.

9. A fixing device according to claim 1, wherein the unfixed toner image contacts with said fixing rotary member, and the unfixed toner image receives electrostatic attractive force directed to said back-up member.

10. A fixing device according to claim 1, wherein said back-up member has an actual resistance of $10^3$ Ω to $10^{11}$ Ω.

11. A fixing device according to claim 1, wherein said low resistance elastic layer is grounded via a rectifier element, said rectifier element being connected in a direction that electric charges having the polarity opposite to that of the unfixed toner can be shifted from the grounded side to said low resistance elastic layer.

12. A fixing device according to claim 1, wherein said back-up member includes an electrically conductive surface resin layer which is provided on said low resistant elastic layer.

13. A fixing device, comprising:
   a fixing rotary member having an electrically conductive core member and an electrically insulative non-adhesive surface layer provided thereon;
   voltage applying means for applying a bias voltage to said conductive core member ;and
   a back-up member forming a nip with said fixing rotary member,
   wherein a recording material bearing an unfixed toner image is pinched and conveyed through said nip to fix the unfixed toner image on the recording material, and
   said back-up member includes a low resistant elastic layer at a surface thereof or in the vicinity of the surface, wherein a volume resistivity value of said low resistant elastic layer is $10^2$ Ω to $10^5$ Ω·cm.

14. A fixing device according to claim 13, wherein the volume resistivity value of said non-adhesive surface layer is not less than $10^{14}$ Ω cm.

15. A fixing device according to claim 13, wherein said non-adhesive surface layer is made of pure fluororesin.

16. A fixing device according to claim 13, wherein said bias voltage has the same polarity as the unfixed toner image.

17. A fixing device according to claim 16, wherein the unfixed toner image contacts with said fixing rotary member.

18. A fixing device according to claim 13, wherein said low resistant elastic layer is a surface rubber layer.

19. A fixing device according to claim 13, wherein said low resistant elastic layer is a rubber layer, and an electrically insulative surface resin layer is provided on said rubber layer.

20. A fixing device according to claim 13, wherein both ends of said non-adhesive surface layer extend outwardly over both ends of said low resistant elastic layer.

21. A fixing device according to claim 20, wherein when the voltage applied to said rotary member is V (V), a difference $\overline{AB}$ (mm) is a distance between an end of said non-adhesive surface layer and a corresponding end of said back-up member is indicated as the following equation:

$$\overline{AB} \text{ (mm)} = V/300 + \alpha \text{ (mm)},$$

where $\alpha$ is a tolerance value and $\alpha \leq 1$ mm.

22. A fixing device according to claim 21, wherein said distance $\overline{AB}$ is V/300 (mm).

23. A fixing device according to claim 13, further comprising electrical charge removing means for removing an electrical charge on said non-adhesive surface layer.

24. A fixing device according to claim 13, wherein said back-up member has an actual resistance of $10^3$ Ω to $10^{11}$ Ω.

25. A fixing device according to claim 13, wherein said low resistance elastic layer is grounded.

26. A fixing according to claim 13, wherein said low resistance elastic layer is grounded via a rectifier element, said rectifier element being connected in a direction that electric charges having the polarity opposite to that of the unfixed toner can be shifted from the grounded side to said low resistance elastic layer.

27. A fixing device according to claim 13, wherein said fixing device is disposed downstream of a transfer portion to transfer a toner image onto the recording material by a charge in a convey direction of the recording member, and a length of the recording material is longer than a distance between the transfer portion and the fixing nip.

28. A fixing device according to claim 13, wherein a surface releasing layer is provided on said low resistance elastic layer.

29. A fixing device according to claim 28, wherein said surface releasing layer has a thickness of 60 μm or less.

30. A fixing device according to claim 13, wherein said back-up member includes an electrically conductive surface resin layer which is provided on said low resistant layer.

* * * * *

UNITED STATES PATENT AND TRADEMARK OFFICE
CERTIFICATE OF CORRECTION

PATENT NO. : 6,005,594
DATED : December 21, 1999
INVENTOR(S) : Hideo Nanataki et al.

It is certified that error appears in the above-identified patent and that said Letters Patent is hereby corrected as shown below:

Title page,
Item [75], Inventor, "Yasumasa Ohtsuka, Yokohama; Takayasu Yuminamochi, Yokohama; Akihiko Takeuchi, Yokohama;" should read -- Yasumasa Ohtsuka, Takayasu Yuminamochi, Akihiko Takeuchi, all of Yokohama; --.

Figures 20 & 21,
Sheet 10, insert attached Fig. 20 and Fig 21.

Column 9,
Line 15, "$10^7$-$\mathbf{10^{10}}$ $\Omega$.cm" should read -- $10^7$-$10^{10}$ $\Omega$.cm --.

Column 10,
Line 5, "a" (1st occurrence) should read -- $\alpha$ --.

Signed and Sealed this

Twenty-ninth Day of January, 2002

Attest:

Attesting Officer

JAMES E. ROGAN
Director of the United States Patent and Trademark Office